(12) United States Patent
Hakii

(10) Patent No.: US 7,990,606 B2
(45) Date of Patent: Aug. 2, 2011

(54) DISPLAY ELEMENT

(75) Inventor: Takeshi Hakii, Sagamihara (JP)

(73) Assignee: Konica Minolta Holdings, Inc. (JP)

( * ) Notice: Subject to any disclaimer, the term of this patent is extended or adjusted under 35 U.S.C. 154(b) by 145 days.

(21) Appl. No.: 12/377,998

(22) PCT Filed: Aug. 1, 2007

(86) PCT No.: PCT/JP2007/065063
§ 371 (c)(1),
(2), (4) Date: Feb. 18, 2009

(87) PCT Pub. No.: WO2008/023551
PCT Pub. Date: Feb. 28, 2008

(65) Prior Publication Data
US 2010/0165449 A1    Jul. 1, 2010

(30) Foreign Application Priority Data

Aug. 22, 2006   (JP) ................................. 2006-225108

(51) Int. Cl.
*G02B 26/00* (2006.01)
(52) U.S. Cl. ......... 359/297; 359/290; 359/291; 359/295
(58) Field of Classification Search .......... 359/290–291, 359/295, 297
See application file for complete search history.

(56) References Cited

U.S. PATENT DOCUMENTS

| 4,240,716 A | 12/1980 | Camlibel et al. |
| 2005/0087448 A1* | 4/2005 | Takahashi .................... 205/334 |
| 2005/0213186 A1* | 9/2005 | Kokeguchi et al. .......... 359/265 |
| 2006/0097982 A1 | 5/2006 | Arai et al. |
| 2008/0166590 A1 | 7/2008 | Kokeguchi |

FOREIGN PATENT DOCUMENTS

| EP | 1510854 A1 | 3/2005 |
| JP | 57-143356 A | 9/1982 |
| JP | 11-185836 A | 7/1999 |
| JP | 3428603 B2 | 5/2003 |
| JP | 2003-241227 A | 8/2003 |
| JP | 2004-54221 A | 2/2004 |
| JP | 2004-309946 A | 11/2004 |
| JP | 3623050 B2 | 12/2004 |
| WO | 03/102684 A1 | 12/2003 |
| WO | 2006/082700 A1 | 8/2006 |

OTHER PUBLICATIONS

Extended European Search Report for Application No./Patent No. 07805890.6-2205/2056277 dated Jun. 18, 2010.
International Search Report for International Application No. PCT/JP2007/065063 mailed Oct. 9, 2007 with English Translation.

* cited by examiner

*Primary Examiner* — Jessica T Stultz
*Assistant Examiner* — Mahidere S Sahle
(74) *Attorney, Agent, or Firm* — Cantor Colburn LLP

(57) ABSTRACT

Provided is a display element, which has simple member configuration, can be driven at a low voltage, and has high display contrast, white display reflectance and high display speed and less display nonuniformity in a long term. The display element has an electrolyte layer, which includes silver or a compound having silver in the chemical structure, between counter electrodes and drives the counter electrodes to melt and deposit the silver. The electrolyte layer contains a butyral resin, a coloring material having an average primary grain diameter of 200 nm or more but not more than 1,000 nm, and an organic solvent having a boiling point of 120° C. or higher but not higher than 300° C. The mass ratio of the organic solvent to the butyral resin is 10:1 or more but not more than 10:5.

19 Claims, No Drawings

US 7,990,606 B2

DISPLAY ELEMENT

CROSS REFERENCE TO RELATED APPLICATIONS

This is a U.S. national stage of application No. PCT/JP2007/065063, filed on 1 Aug. 2007. Priority under 35 U.S.C. §119(a) and 35 U.S.C. §365(b) is claimed from Japanese Application No. 2006-225108, filed 22 Aug. 2006, the disclosure of which is also incorporated herein by reference.

FIELD OF TECHNOLOGY

The present invention relates to an electrochemical display element applying dissolution and deposition of silver.

TECHNICAL BACKGROUND

Recently, chance of getting and leading information of documents and images in a form of electronic information simpler than those in a form of usual printed material on paper is more increased accompanied with increasing in the rapidness of the processing speed of personal computer, spreading of network infrastructure and capacity glowing and cost lowering of data storage.

As the means for leading such the electronic information, liquid crystal displays and CRT are usually used and light emission type displays such as an organic electroluminescent are mainly applied recently. However, it is necessary to observe such the leading means for long time, particularly, when the electronic information is information of documents. Such the action is difficultly considered as a gentle means for the human. As the problems of such the light emission type displays, it has been known that eyes are fatigued by flicker, portability is low, posture for leading is limited and focusing on the still image is necessary and electric consumption is increased accompanied with prolongation of the leading time.

Although memory type reflective displays utilizing outside light which do not consume electric power for sustaining the image have been known as the means for compensating such the defects, such the displays are difficultly considered to have sufficient properties in the present condition by the following reasons.

In the system using a polarizing plate such as a reflective liquid crystal plate, the reflectivity is low as about 40% so that display of white image is insufficiently and majority of the production methods to be used for producing the constituting parts of the display is not always simple is utilized. A polymer dispersion type liquid crystal requires high voltage and the contrast of the obtained image is not insufficient since difference of between the refractive indexes of organic compounds. A polymer network type liquid crystal has problems that high voltage is required and a complex TFT circuit is necessary for improving the memorizing ability. A displaying element using electrophoresis requires high voltage such as 10 V or more and has anxiety about lowering in the durability caused by coagulation of the electrophoresis particles. An electrochromic displaying element is insufficient in the color quality of black or color such as yellow, magenta, cyan, blue, green and red, and has anxiety about that complex layer formation such as vapor deposition is necessary for sustaining the memorizing ability though such the element can be driven at low voltage such as 3 V or less.

An electro-deposition system, hereinafter referred to as ED system, applying the dissolution-deposition of metal or metal salt has been known as a method for dissolving such the problems of each of the above systems. The ED system has advantages such as that the element can be driven at low voltage such as 3 V or less, the structure of the cell is simple, the contrast of black and white in the image is suitable and the quality of black image is high, and various methods are disclosed; cf. Patent Documents 1 to 3, for example.

As a result of detailed investigation on the technology disclosed in the above Patent Documents by the inventors it is found that the reflectivity on the occasion of displaying white image and the displaying speed are insufficient for satisfying the recent needs of the consumers. For instance, addition of titanium dioxide to the electrolyte liquid can be cited as a method for controlling the reflectivity on the occasion of displaying white color. However, it is found that undesirable unevenness on the displayed image is caused by coagulation of the titanium dioxide particles when the adding amount of the titanium dioxide is increased. Moreover, it has been known as to the method of solidifying the electrolyte by adding a butyral type resin to the electrolyte that the displaying speed is considerably lowered even though the coagulation of the titanium dioxide is improved; cf. Patent Document 4 and Non-Patent Document 1, for example. Moreover, it is found that other problems such as that leaking of liquid and variation in the displaying property during prolonged using term are caused in the displaying element using the liquid electrolysis under various using conditions practically assumed. As to the problems of the liquid leaking and the property variation during the prolonged using term, a method for gelling the electrolysis by adding a gelling agent such as an ethylene oxide type resin or a gelling agent having a molecular weight of not more than 1,000 is investigated; cf. Patent Documents 5 to 7, for example.

As a result of detailed investigation on the methods disclosed in Patent Documents 5 to 7, it is found that the unevenness on the displayed image caused by coagulation of titanium dioxide is formed during repeating use since the titanium dioxide sustaining ability of the ethylene oxide type resin or the gelling agent having a molecular weight of not more than 1,000 is in sufficient and the displaying speed is considerably lowered when the ethylene oxide type resin or the gelling agent having a molecular weight of not more than 1,000 is added into the electrolyte.

Patent Document 1: U.S. Pat. No. 4,240,716
Patent Document 2: Japanese Registration Patent No. 3428603
Patent Document 3: Japanese Patent Publication Open to Public Inspection (hereinafter referred to as JP-A) No. 2003-241227
Patent Document 4: Japanese Registration Patent No. 3623050
Patent Document 5: JP-A No. S57-143356
Patent Document 6: JP-A No. 2004-309946
Patent Document 7: JP-A No. H11-185836
Non-Patent Document 1: N. Kobayashi, N. Nishimura and H. Ohotomo, Polymer Electrolyte with Large Temperature-Dependent Conductivity for Novel Electrochromic Imaging, Electrochim. Acta, 50, 3886-3890 (2005)

DISCLOSURE OF THE INVENTION

Problems to be Solved by the Invention

The present invention is attained relating to the above-mentioned problems, and the object of the invention is to provide a displaying element which has simple member configuration, can be driven at a low voltage, and has high display contrast, white display reflectance, and high display speed and less display uniformity in a long term.

Means for Solving the Problems

The object of the invention can be attained by the following constitution.

1. A display element having an electrolyte layer containing silver of a compound containing silver in the chemical structure thereof between opposite electrodes and the opposite electrodes are driven so as to cause dissolution-deposition of silver, in which the electrolyte layer contains a butyral resin, a coloring material having an average primary particle diameter of from 200 nm to 1,000 nm and an organic solvent having a boiling point of from 120° C. to 300° C. and the weight ratio of the organic solvent to the butyral resin is within the range of from 10:1 to 10:5.

2. The display element described in the above 1, in which the weight ratio of the organic solvent to the butyral resin is within the range of from 10:1 to 10:3.

3. The display element described in the above 1 or 2, in which the butyral resin has a polymerization degree of from 300 to 1,000.

4. The display element described in the above 1 or 2, in which the butyral resin has a polymerization degree of from 400 to 800.

5. The display element described in any one of the above 1 to 4, in which the number of PVA group represented by the following (A) is within the range of from 15% to 25% of the total number of the PVA group, PVAc group represented by the following (B) and PVB group represented by the following (C);

$$—CH_2—CH(OH)— \quad (A)$$

PVA group $$—CH_2—CH(OCOCH_3)— \quad (B)$$

PVAc group $$—CH_2—CHCH_2—CH— \atop {\backslash \quad \quad /} \atop {OCH—O} \atop {|} \atop {R} \quad (C)$$

PVB group in the above formulas, R is a hydrogen atom, an alkyl group, a cycloalkyl group, an aryl group or a heterocyclic group.

6. The display element described in any one of the above 1 to 5, in which the organic solvent has a boiling point of from 200° C. to 300° C.

7. The display element described in any one of the above 1 to 6, in which the organic solvent has a dielectric constant of from 30 to 80.

8. The display element described in any one of the above 1 to 7, in which the organic solvent is a cyclic carboxylic acid ester type compound.

9. The display element described in any one of the above 1 to 8, in which the coloring material is titanium dioxide.

10. The display element described in the above 9, in which the surface of the titanium dioxide is treated by $SiO_2$, $Al_2O_3$ or an organic compound.

11. The display element described in any one of the above 1 to 10, in which the weight ratio of the organic solvent to the coloring material in the electrolyte layer is within the range of from 10:1 to 10:10.

12. The display element described in any one of the above 1 to 10, in which the weight ratio of the organic solvent to the coloring material in the electrolyte layer is within the range of from 10:2 to 10:8.

13. The display element described in any one of the above 1 to 12, in which the electrolyte layer contains a mercapto compound or a thioether compound.

14. The display element described in the above 13, in which the mercapto compound is a compound represented by the following Formula 1:

$$MS-\underset{}{\overset{\overset{Z}{\frown}}{=}}N-(R_1)_n \quad \text{Formula 1}$$

in the above formula, M is a hydrogen atom, a metal atom or a quaternary ammonium, Z is a nitrogen-containing heterocyclic group, n is an integer of from 0 to 5, and $R_1$ is a hydrogen atom, a halogen atom, an alkyl group, an aryl group, an alkylcarbonamido group, an arylcarbonamido group, an alkylsulfonamido group, an arylsulfonamido group, an alkyloxy group, an aryloxy group, an alkylthio group, an arylthio group, an alkylcarbamoyl group, an arylcarbamoyl group, a carbamoyl group, an alkylsulfamoyl group, an arylsulfamoyl group, a sulfamoyl group, a cyano group, an alkylsulfonyl group, an arylsulfonyl group, an alkoxycarbonyl group, an aryloxycarbonyl group, an alkylcarbonyl group, an arylcarbonyl group, an acyloxy group, a carboxyl group, a carbonyl group, a sulfonyl group, an amino group, a hydroxyl group or a heterocyclic group, and each of the groups of $R_1$ may be the same as or different from each other when n is 2 or more and may be bonded with each other for forming a condensed ring.

15. The display element described in the above 13, in which the thioether compound is a compound represented by the following Formula 2:

$$R_2—S—R_3 \quad \text{Formula 2}$$

In the above formula, $R_2$ and $R_3$ are each an alkyl group, an aryl group or a heterocyclic group which may be the same or different and may be bonded with together to form a ring.

16. The display element described in any one of the above 1 to 15, in which the electrolyte layer is formed by screen printing.

17. The display element described in any one of the above 1 to 15, in which the electrolyte layer is formed by dropping from a dispenser.

18. The display element described in any one of the above 1 to 15, in which the electrolyte layer is formed by an inkjet method.

19. The display element described in any one of the above 1 to 18, in which at least one of the opposite electrodes is formed on a plastic substrate plate.

20. The display element described in any one of the above 1 to 18, in which the electrolyte layer is formed by adding the coloring material after dissolving the butyral type resin in the organic solvent.

Effects of the Invention

A displaying element which has simple member configuration, can be driven at a low voltage, and has high display contrast, white display reflectance, and high display speed and less display uniformity in a long term can be provided by the invention.

THE BEST EMBODIMENT FOR EMBODYING THE INVENTION

The best embodiment for embodying the invention is described in detail below.

As a result of investigation by the inventors on the above-described objects, it is found that the displaying element which has simple member configuration, can be driven at a low voltage, and has high display contrast, white display reflectance, and high display speed and less display uniformity in a long term can be realized by a display element having an electrolyte layer containing silver or a silver-containing organic compound between opposite electrodes and the opposite electrodes is driven so as to cause dissolution-deposition of silver, in which the electrolyte layer contains a coloring material having an average primary particle diameter of from 200 nm to 1,000 nm and an organic solvent having a boiling point of from 120° C. to 300° C. and the weight ratio of the organic solvent to the butyral resin is within the range of from 10:1 to 10:5. Thus the invention is attained.

The invention is described in detail below.

The display element of the invention is a display element according to the ED system which has an electrolyte layer containing silver or a compound containing silver in the chemical structure thereof placed between opposite electrodes and the opposite electrodes are driven so as to cause dissolution—deposition of silver.

<<Silver or Compound Containing Silver in the Chemical Structure Thereof>>

The silver and the compound containing silver in the chemical structure thereof relating to the invention is the general term of compounds such as silver oxide, silver sulfide, metallic silver, silver colloid particles, silver halide, silver complex compounds and silver ions, and the state of phase such as a solid state, solubilized state or vaporized state is not specifically limited.

<<Basic Structure of Display Element>>

In the display element of the invention, a pair of electrodes facing to each other is provided at the ED displaying portion. A transparent electrode such as ITO electrode is provided onto an electrode 1, one of the suropposite electrodes near the ED display portion, and a metal electrode such as silver electrode is provided onto another electrode 2. An electrolyte layer containing silver or the compound containing silver in the chemical structure thereof is held between the electrode 1 and the electrode 2. Redox reaction of silver is caused on the electrodes 1 and 2 by applying both polars, negative and positive, voltage between the opposite electrodes so that a black silver image in a reduced state and a transparent of silver in a oxidized state can be reversibly changed.

<<Electrolyte Layer>>

The electrolyte layer formed between the opposite electrodes relating to the invention is characterized in that the layer contains a butyral resin, a colorant material having an average primary particle diameter of from 200 to 1,000 nm and an organic solvent and the weight ratio of the organic solvent to the butyral resin is within the range of from 10:1 to 10:5. The electrolyte layer relating to the invention is formed by the presence of the butyral resin and the organic solvent preferably a nonvolatile organic solvent having a boiling point of from 200° C. to 300° C. and is an electrolyte in a gel state having suitable viscosity, not solid state nor liquid state with low viscosity.

The electrolyte is usually classified into a liquid electrolyte and a polymer electrolyte. The polymer electrolyte is further classified into a solid electrolyte substantially composed of a solid compound and a gel state electrolyte composed of a polymer compound and a liquid electrolyte. From the view point of fluidity, the solid electrolyte substantially has no fluidity and the gel electrolyte has middle fluidity between the liquid electrolyte and the solid electrolyte.

Accordingly, the gel electrolyte in the invention is a electrolyte liquid having high viscosity and fluidity at room temperature, for example, the electrolyte having a viscosity of from 100 mPa·s to 1,000 mPa·s at 25° C. The gel electrolyte in the invention is not necessary always to have thermal sol-gel reversible changing ability.

Each of the constituting components of the electrolyte layer relating to the invention is described below.

(Coloring Material)

The coloring agent related to the invention is a material capable of controlling the displaying color by adding into the electrolyte layer and is preferably an inorganic material and more preferably a metal oxide. As the metal oxide, titanium dioxide (anatase type and rutile type), barium sulfate, calcium carbonate, aluminum oxide, zinc oxide, magnesium oxide, zinc hydroxide, magnesium hydroxide, magnesium phosphate, magnesium hydrogen phosphate, an alkaline earth metal salt, talk, kaolin, zeolite, acid clay and glass can be exemplified.

As the organic compound, polystyrene, an acryl resin, an ionomer, an ethylene-vinyl acetate copolymer resin, benzoguanamine resin, a urea-formalin resin, a melamine-formalin resin, and a polyamide resin may be used singly, in a mixed state or in particle state having voids therein for varying the refractive index.

In the invention, titanium dioxide, zinc oxide, and zinc hydroxide are preferable among the above coloring materials and titanium dioxide is particularly preferably used from the viewpoint of coloring prevention at high temperature and the reflectance of the element caused by the refractive index. Moreover, titanium dioxide is preferably one treated by an inorganic oxide such as $Al_2O_3$ and $SiO_2$ on the surface thereof.

The coloring material relating to the invention can be used by adding to a mixture of the organic solvent and butyral resin composing the electrolyte layer relating to the invention and dispersing into the electrolyte material by a wet type fine crushing disperser such as a ultrasonic disperser and a beads mill.

In the invention, the weight ratio of the organic solvent to the coloring agent is preferably within the range of from 10:1 to 10:10, and more preferably from 10:2 to 10:8.

The coloring material relating to the invention is preferably added to the organic solvent after dissolving the butyral resin.

(Butyral Resin)

In the layer relating to the invention, it is characterized in that the butyral rein is used as the resin material from the viewpoint of forming the gel state.

Though the butyral resin capable of being applied to the invention is not specifically limited, a butyral resin in which the number of PVA group represented by the foregoing (A) is preferably within the range of from 15% to 25% of the total number of 1) the PVA group, 2) PVAc group represented by foregoing (B) and 3) PVB group represented by the foregoing (C), from the standpoint of enhancing the effect of the object of the invention.

The butyral resin is preferably a resin having an average polymerization degree of from 300 to 1,000 and more preferably from 400 to 800.

The butyral resin relating to the invention can be used by adding to the organic solvent and then dissolved by heating and the weight ratio of the organic solvent to the butyral resin is within the range of from 10:1 to 10:5 and more preferable range is from 10:1 to 10:3.

Concrete examples of the butyral resin usable in the electrolyte layer relating to the invention include #3000-1, #3000-2, #3000-4, #3000-K, #4000-2, #5000-A, #5000-D, #6000-C, #6000-AS and #6000-CS, each manufactured by Denki Kagaku Kogyo K.K., and S-LEC series manufactured by Sekisui Chemical Co. Lid.

(Organic Solvent)

The organic solvent capable of being applied to the electrolyte layer relating to the invention is not specifically limited as long as the boiling point of the organic solvent is within the range of from 120° C. to 300° C., which can be remaining in the electrolyte layer without evaporation after the formation of the electrolyte layer. As examples of the organic solvent, propylene carbonate, ethylene carbonate, ethyl methyl carbonate, diethyl carbonate, dimethyl carbonate, butylene carbonate, γ-butylactone, tetramethylurea, sulfolane, dimethylsulfoxide, 1,3-dimethyl-2-imidazolidinone, 2-(N-methyl)-2-pyrrolidinone, hexamethylphosphortriamide, N-methylpropionamide, N,N-dimethylacetamide, N-methylacetamide, N,N-dimethylformamide, N-methylformamide, butylonitrile, propiontrile, acetonitrile, acetylacetone, 4-methyl-2-pentanone, 2-butanol, 1-butanol, 2-propanol, 1-propanol, ethanol, methanol, acetic anhydride, ethyl acetate, ethyl propionate, dimethoxiethane, diethoxyfuran, tetrahydrofuran, ethylene glycol, diethylene glycol and triethylene glycol monobutyl ether can be cited.

Among the above organic solvents, ones having a boiling point of from 200° C. to 300° C. or ones having a dielectric constant of from 30 to 80 are preferable. Examples of such the organic solvent include propylene carbonate, ethylene carbonate, ethyl methyl carbonate, diethyl carbonate, γ-butylactone, 2-(N-methyl)-2-pyrrolydinone, N-methylpropionamide, N,N-dimethylformamide and acetylacetone.

As examples of another solvent usable in the invention, the compounds described in J. A. Riddick, W. B. Bunger, T. K. Sakano, "Organic Solvent", $4^{th}$ ed., John Wiley & Sons (1986), Y. Marcus, "Ion Solvation", John Wiley & Sons (1985), C. Reichardt, "Solvents and Solvent Effects in Chemistry" $2^{nd}$ ed., VCH (1988), G. J. Janz, R. P. T. Tomkins, "Nonaqueous Electrolytes Handbook" Vol. 1, Academic Press (1972) are cited.

(Mercapto Compound, Thioether Compound)

It is preferable that the electrolyte layer relating to the invention contains a mercapto compound or a thioether compound together with the above-mentioned coloring material, butyral resin and organic solvent and the mercapto compound is preferably ones represented by the foregoing Formula 1 and the thioether compound is preferably ones represented by the foregoing Formula 2.

The mercapto compound represented by Formula 1 relating to the invention is described below.

In the foregoing Formula 1, M is a hydrogen atom, a metal atom or a quaternary ammonium, Z is a nitrogen-containing heterocyclic group, n is an integer of from 0 to 5, and $R_1$ is a hydrogen atom, a halogen atom, an alkyl group, an aryl group, an alkylcarbonamido group, an arylcarbonamido group, an alkylsulfonamido group, an arylsulfonamido group, an alkyloxy group, an aryloxy group, an alkylthio group, an arylthio group, an alkylcarbamoyl group, an arylcarbamoyl group, a carbamoyl group, an alkylsulfamoyl group, an arylsulfamoyl group, a sulfamoyl group, a cyano group, an alkylsulfonyl group, an arylsulfonyl group, an alkoxycarbonyl group, an aryloxycarbonyl group, an alkylcarbonyl group, an arylcarbonyl group, an acyloxy group, a carboxyl group, a carbonyl group, a sulfonyl group, an amino group, a hydroxyl group or a heterocyclic group, and each of the groups of $R_1$ may be the same as or different from each other when n is 2 or more and may be bonded with each other for forming a condensed ring.

As examples of the metal atom represented by M in Formula 1, Li, Na, K, Mg, Ca, Zn and Ag are cited. As examples of the quaternary ammonium, $NH_4$, $N(CH_3)_4$, $N(H_4C_9)_4$, $N(CH_3)_3C_{12}H_{25}$, $N(CH_3)_3C_{16}H_{33}$ and $N(CH_3)_3CH_2C_6H_5$ are cited.

As the nitrogen-containing heterocyclic group represented by Z in Formula 1, a tetrazole ring, a triazole ring, an oxadiazole ring, a thiadiazole ring, an indole ring, an oxazole ring, a benzoxazole ring, a benzothiazole ring, a benzoselenazole ring and a naphthoxazole ring are cited for example.

As the halogen atom represented by $R_1$ in Formula 1, a fluorine atom, a chlorine atom, a bromine atom and an iodine atom are cited for example. As the alkyl group, a methyl group, an ethyl group, a propyl group, an i-propyl group, a butyl group, a t-butyl group, a pentyl group, a cyclopentyl group, a hexyl group, a cyclohexyl group, an octyl group, a dodecyl group, a hydroxyethyl group, a methoxyethyl group, a trifluoromethyl group and a benzyl group are cited for example. As the aryl group, a phenyl group and a naphthyl group are cited for example. As the alkylcarbonamido group, an acetylamino group, a propionylamino group and butyloylamino group are cited for example. As the arylcarbonamido group, a benzoylamino group is cited for example. As the alkylsulfonamido group, a methanesulfonylamino group and an ethanesulfonylamino group are cited for example. As the arylsulfonamido group, a benzenesulfonylamino group and a toluenesulfonamino group are cited for example. As the aryloxy group, a phenoxy group is cited for example. As the alkylthio group, a methylthio group, an ethylthio group and butylthio group are cited for example. As the arylthio group, a phenylthio group and a tolylthio group are cited for example. As the alkylcarbamoyl group, a methylcarbamoyl group, a dimethylcarbamoyl group, an ethylcarbamoyl group, a diethylcarbamoyl group, a dibutylcarbamoyl group, a piperidylcarbamoyl group and a morphorylcarbamoyl group are cited for example. As the arylcarbamoyl group, a phenylcarbamoyl group, a methylphenylcarbamoyl group, an ethylphenylcarbamoyl group and a benzylphenylcarbamoyl group are cited for example. As the alkylsulfamoyl group, a methylsulfamoyl group, a dimethylsulfamoyl an ethylsulfamoyl group, a diethylsulfamoyl group, a dibutylsulfamoyl group, a piperidylsulfamoyl group and a morphorylsulfamoyl group are cited for example. As the arylsulfamoyl group, a phenylsulfamoyl group, a methylphenylsulfamoyl group, an ethylphenylsulfamoyl group and a benzylphenylsulfamoyl group are cited for example. As the alkylsulfonyl group, a methanesulfonyl group and an ethanesulfonyl group are cited for example. As the arylsulfonyl group, a phenylsulfonyl group, a 4-chlorophenyl-sulfonyl group and a p-toluenesulfonyl group are cited for example. As the alkoxycarbonyl group, a methoxycarbonyl group, an ethoxycarbonyl group and a butoxycarbonyl group are cited for example. As the aryloxycarbonyl group, a phenoxycarbonyl group is cited for example. As the alkylcarbonyl group, an acetyl group, a propionyl group and a butyloyl group are cited for example. As the arylcarbonyl group, a benzoyl group and an alkylbenzoyl group are cited for example. As the acyloxy group, an acetyloxy group, a propionyloxy group and a butyloyloxy group are cited for example. As the heterocyclic group, an oxazole ring, a thiazole ring, a triazole ring, a selenazole ring, a tetrazole ring, an oxadiazole ring, a thiadiazole ring, a thiazine ring, a triazine ring, a benzoxazole ring, benzothiazole ring, an indolenine ring, a benzoselenazole ring, a nephthothiazole ring, triazaindolidine ring, a diazaindolidine ring and a tetrazaindolidine ring are cited for example. These substituents each may have a substituent.
Preferable concrete compounds represented by Formula 1 are shown below though the invention is not limited to these compounds.
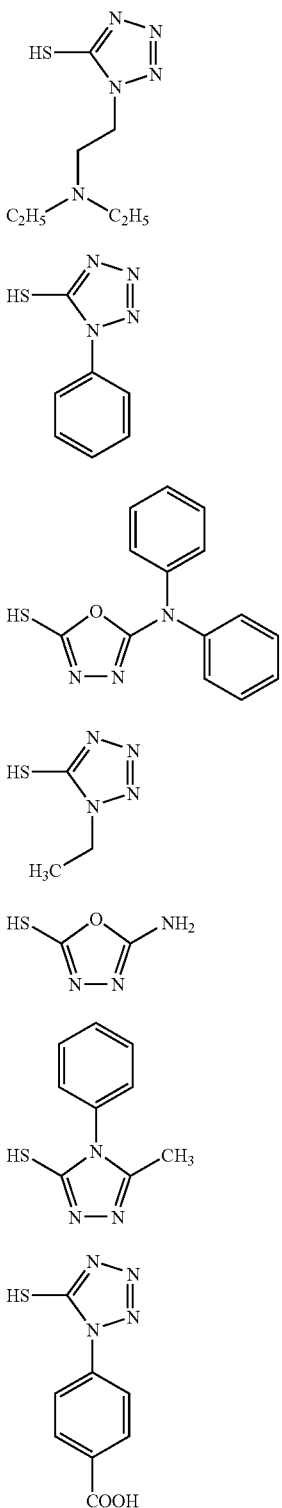
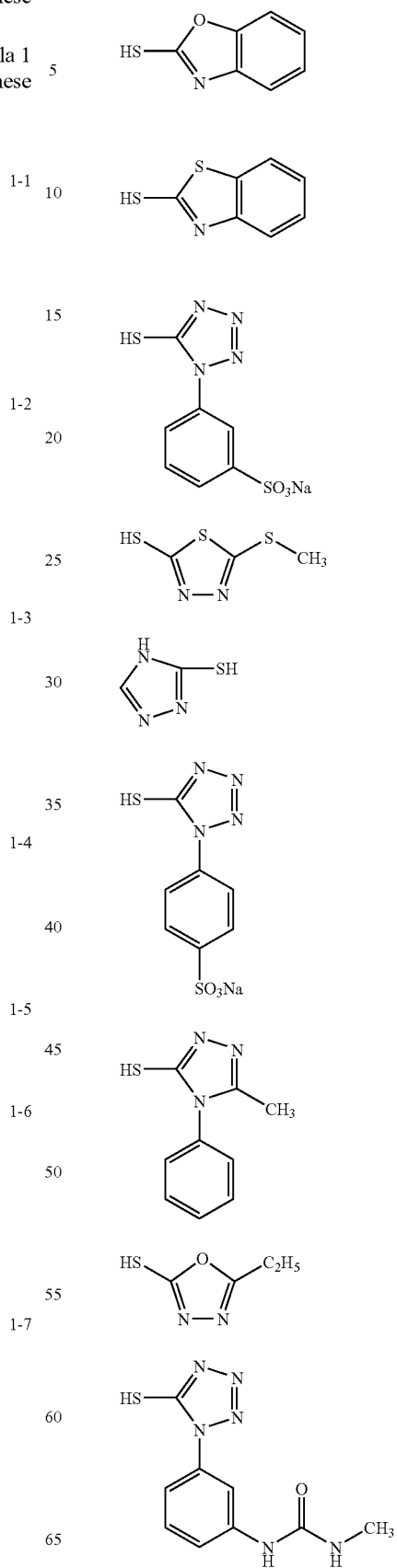

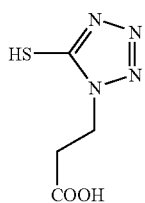

The thioether compound represented by Formula 2 is described below.

In the foregoing Formula 2, $R_2$ and $R_3$ are each an alkyl group, an aryl group or a heterocyclic group which may be the same or different and may be bonded with together for forming a ring.

As the alkyl group represented by $R_2$ or $R_3$ in Formula 2, a methyl group, an ethyl group, a propyl group, an i-propyl group, a butyl group, a t-butyl group, a pentyl group, a cyclopentyl group, a hexyl group, a cyclohexyl group, an octyl group, a dodecyl group, a hydroxyethyl group, a methoxyethyl group, a trifluoromethyl group and a benzyl group are cited for example. As the aryl group, a phenyl group and a naphthyl group are cited for example. As the heterocyclic group, an oxazole ring, an imidazole ring, a thiazole ring, a triazole ring, a selenazole ring, a tetrazole ring, an oxadiazole ring, a thiadiazole ring, a thiazine ring, a triazine ring, a benzoxazole ring, a benzothiazole ring, a benzimidazole ring, an indolenine ring, a benzoselenazole ring, a naphthothiazole ring, a triazaindolidine ring, diazaindolidine ring and a tetrazaindolidine ring are cited for example. These substituents include ones each further having a substituent.

Preferable concrete compounds represented by Formula 2 are shown below though the invention is not limited to these compounds.

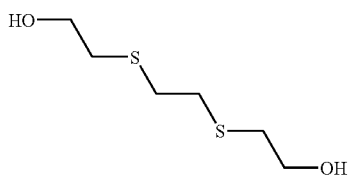

2-1

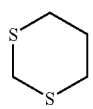

2-2

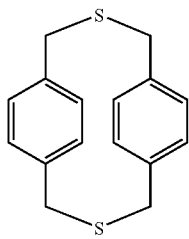

2-3

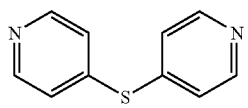

2-4

The mercapto compounds or the thioether compounds may be used solely or in combination of plural kinds thereof. The mole ratio of sum of the mercapto compound and the thioether compound to Ag ions is preferably within the range of from 0.2 to 2.

(Concentration Ratio of Halogen Ions and Silver Ions)

In the display of the invention, it is preferable that the mole concentration of halogen ions or halogen atoms contained in the electrolyte [X] (mol/kg) and the mole concentration of sum of silver or silver contained in the chemical structure of the silver-containing compound [Ag] (mole/kg) satisfy the condition represented by the following Expression 1.

$$0 \leq [X]/[Ag] \leq 0.01 \quad \text{Expression 1}$$

In the invention, the halogen atom is an iodine atom, a chlorine atom, a bromine atom or a fluorine atom. When [X]/[Ag] is 0.01 or more, $X^- \rightarrow X_2$ is caused on the occasion of redox reaction of silver and $X_2$ easily causes cross-oxidation of blacken silver so as to dissolve the silver and makes a cause of lowering in the memorizing ability. Therefore, the mole number of the halogen atom is as lower as possible than that of silver. In the invention, the condition of $0 \leq [X]/[Ag] \leq 0.001$ is more preferable. As to the kind of halogen, the sum of each of the kinds of halogen is preferably [I]<[Br]<[Cl]<[F] when halogen ions are added.

(Electrolyte-Silver Salt)

In the display of the invention, a known silver salt compound such as silver iodide, silver chloride, silver bromide, silver oxide, silver sulfide, silver citrate, silver acetate, silver behenate, silver p-toluenesulfonate, a silver salt of a mercapto compounds and a silver complex of an iminodiacetic acid can be used. Among them, a silver salt of the halogen atom, a carboxylic acid or a compound without nitrogen atom having coordination ability with silver is preferable. For instance, silver p-toluenesulfonate is preferable.

The concentration of silver ion contained in the electrolyte relating to the invention is preferably 0.2 moles/kg$\leq$[Ag]$\leq$2.0 moles/kg. When the silver ion concentration is lower than 0.2 moles/kg, the silver solution is made to dilute and the deriving speed is lowered. When the silver ion concentration is higher than 2.0 moles/kg, the solubility is lowered and the deposition tends to be caused during the storage at low temperature. Therefore, such the conditions are disadvantageous.

(Electrolyte Material)

In the display of the invention, the following compounds may be contained in the gelled electrolyte layer; examples of such the compound include a potassium compound such as KCl, KI and KBr, a lithium compound such as $LiBF_4$, $LiClO_4$, $LiPF_6$ and $LiCF_3SO_3$, and a tetralakylammonium compound such as tetraethylammonium perchlorate, tetrabutylammonium perchlorate, tetraethylammonium borofluoride and a terabutylammonium halide. The melted electrolyte compositions described in JP-A 2003-187881, [0062] to [0081] are also preferably usable. Moreover, a compound formable a redox pair such as $I^-/I_3^-$, $Br^-/Br_3^-$ and quinine/hydroquinone can be used.

(Thickener to be Added to Electrolyte)

In the display of the invention, a thickener can be used in the electrolyte layer within the range in which the objective effects and the invention is not disturbed. For example, gelatin, gum arabic, hydroxyethylcellulose, hydroxypropylcellulose, cellulose acetate, cellulose butylate, poly(vinyl pyrrolydone), a poly(alkylene glycol), casein, starch, poly(acrylic acid), poly(methyl methacrylate), poly(vinyl chloride), poly(methacrylic acid), styrene-maleic anhydride copolymer, styrene-acrylonitrile copolymer, styrene-butadiene copolymer, polyesters, polyurethanes, phenoxy resin, poly(vinylidene chloride), polyepoxides, polycarbonates, cellulose esters, polyamides, and a hydrophobic transparent binder such as cellulose acetate, cellulose acetate butylate, polyester, polycarbonate, poly(acrylic acid) and polyurethane are usable.

(Formation of Electrolyte Layer)

The electrolyte layer relating to the invention is preferably formed by at least one method selected from a method by screen printing, a method by dropping by a dispenser and a method by inkjet printing.

The screen printing method is a method in which a screen having designated patterns thereon is overlapped on the electrode surface of the substrate and the electrolyte liquid is applied on the screen to form the electrolyte layer. In the method by dropping the electrolyte liquid by the dispenser, a dispenser having a nozzle with an opening diameter of from 0.1 mm to 1 mm is used and the electrolyte liquid is charged in such the dispenser and cells are formed by ribs at designated positions and filled by the electrolyte liquid. The inkjet method is a method in which the electrolyte liquid is applied in a form of droplets through an inkjet recording head such as a piezoelectric pressure type.

<<Another Constituent>>

In the display of the invention, various constituting layers other than the above-described constituents can be provided according to necessity.

(Porous Electrode Containing Metal Oxide)

In the display of the invention, a porous electrode containing a metal oxide can also be used.

It is found that the redox reaction of silver or the silver-containing compound on the side not for image viewing is caused on or in the porous layer containing metal oxide when the surface of the electrode on the side not for image viewing among the opposite electrodes is protected by the porous electrode containing metal oxide. As a result of that, the selective range of the kind of the electrode on the side not for image viewing can be expanded and the durability can be improved about.

As the metal oxide constituting the porous electrode relating to the invention, titanium dioxide, silicon oxide, zinc oxide, tin oxide, Sn-doped indium oxide (ITO), antimony-doped tin oxide (ATO), fluorine-doped tin oxide (FTO), aluminum-doped zinc oxide and a mixture of the above are cited.

The porous electrode is constituted by bonding or contacting plural fine particles of the above metal oxide. The average diameter of the metal fine particles is preferably from 5 nm to 10 μm, and more preferably from 20 nm to 1 μm. The specific surface area measured by simplified BET method of the metal oxide fine particles is preferably from $1 \times 10^{-3}$ to $1 \times 10^2$ m$^2$/g, and more preferably from $1 \times 10^{-2}$ to 10 m$^2$/g. The metal oxide fine particle having optional shape such as irregular, needle like and sphere may be used.

As the method for forming or bonding the metal oxide fine particles, known sol-gel method and sintering method can be applied; for example, the methods described in 1) Journal of the Ceramic Society of Japan, 102, 2, p. 200, (1994), 2) The Yogyo Kyokai Shi, 90, 4, p. 157, and 3) J. of Non-Cryst. Solids, 82, 400, (1986) are cited. A method can be applied, in which titanium dioxide dendrimer prepared by a fuming method is dispersed on a liquid and coated on the substrate and dried at a temperature about 120 to 150° C. for removing the solvent to obtain the porous electrode. The metal oxide particles are preferably in a bonded state and has a tolerance of not less than 0.1 g, more preferably not less than 1 g, measured by a continuous weighting type surface property measuring apparatus such as a scratch tester.

The "porous" in the invention is a state having penetrating pores through which the ion species can be moved in the porous electrode and deposition of silver can be caused when the porous electrode is provided and potential difference is applied between the opposite electrodes.

(Electron Insulation Layer)

In the display of the invention, an electron insulation layer can be provided.

The electron insulation layer applicable to the invention may be a layer having both of ion insulation ability and electron insulation ability. For instance, a solid electrolyte layer formed by filming a polymer having polarity or a salt thereof, a suspected solid layer constituted by a porous layer having high electron insulation ability which carries an electrolyte in the pores thereof, a porous polymer layer having pores and a porous inorganic material having relatively low dielectric constant such as a silicon-containing compound are cited.

As the method for forming the porous layer, the known methods such as the followings can be applied; a sintering (fusion bonding) method in which polymer fine particles or inorganic particles are added to a binder so as to be partially bonded with together and pores formed between the particles are utilized, an extraction method in which a layer constituted by an organic or inorganic substance soluble in a solvent and a binder insoluble in the solvent is formed and then the organic or inorganic substance is dissolved by the solvent so as to form fine pores, a foaming method in which a polymer is heated or degassed to form foams, a phase conversion method in which a polymer is subjected to phase separation by operating a good solvent and a poor solvent and a radiation irradiating method in which one or more radiations are irradiated for forming fine pores. In concrete, the electron insulation layers described in JP-A H10-30181, JP-A 2003-107626, JP-A H7-95403 and U.S. Pat. Nos. 2,636,715, 2,849,523, 2,987,474, 3,066,426, 3,464,513, 3,483,644, 3,535,942 and 3,062,203 can be cited.

(Another Additive)

As the constituting layer of the display of the invention, auxiliary layers such as a protection layer, filter layer, antihalation layer, crossover light cutting layer and backing layer are cited. In such the auxiliary layers, various chemical sensitizers, noble metal sensitizers, optical sensitizing dyes, super sensitizers, couplers, high-boiling solvents, antifoggants, stabilizers, development inhibitors, bleach accelerators, fixing accelerators, color mixing preventing agents, formalin scavengers, tone controlling agents, hardeners, surfactants, thickeners, plasticizers, lubricants, UV absorbents, irradiation preventing agent, light absorbing filter dyes, anti-mold agent, polymer latexes, heavy metals, antistatic agent and matting agent can be contained according to necessity.

The above additives are described in detail in Research Disclosure, hereinafter referred to as RD, vol. 176, Item/17643 (December 1978), vol. 184, Item/18431 (August 1979), vol. 187, Item/18716 (November 1979), and vol. 308, Item/308119 (December 1989).

The kinds of compounds and the description position thereof in the above there Research Disclosures are shown below.

|  | RD17643 | | RD18716 | RD308119 | |
|---|---|---|---|---|---|
| Additive | Page | Class | Page | Page | Class |
| Chemical sensitizer | 23 | III | 648UR | 96 | III |
| Sensitizing dye | 23 | IV | 648-649 | 996-8 | IV |
| Desensitizing dye | 23 | IV |  | 998 | IV |

-continued

| Additive | RD17643 | | RD18716 | RD308119 | |
|---|---|---|---|---|---|
| | Page | Class | Page | Page | Class |
| Dye | 25-26 | VIII | 649-650 | 1003 | VIII |
| Developing accelerator | 29 | XXI | 648UR | | |
| Antifoggant/Stabilizer | 24 | IV | 649UR | 1006-7 | VI |
| Whitening agent | 24 | V | | 998 | V |
| Hardener | 26 | X | 651L | 1004-5 | X |
| Surfactant | 26-27 | XI | 650R | 1005-6 | XI |
| Antistatic agent | 27 | XII | 650R | 1006-7 | XIII |
| Plasticizer | 27 | XII | 650R | 1006 | XII |
| Lubricant | 27 | XII | | | |
| Matting agent | 28 | XVI | 650R | 1008-9 | XVI |
| Binder | 26 | XXII | | 1003-4 | IX |
| Support | 28 | XVII | | 1009 | XVII |

In the above, UR, R and L is each upper right, right and left, respectively.

(Layer Structure)

The layer structure between the opposite electrodes in the display of the invention is further described below.

A constitution layer containing a positive hole transfer material may be provided as a constitution layer of the display of the invention. Examples of the positive hole transfer material include aromatic amines, triphenylene derivatives, oligothiophene compounds, polypyrrole compounds, polyacetylene derivatives, polyphenylenevinylene derivatives, polythienylenevinylene derivatives, polythiophene derivatives, polyaniline derivatives, polytoluidine derivatives, CuI, CuSCN, CuInSe$_2$, Cu(In,Ga)Se, CuGaSe$_2$, Cu$_2$O, CuS, CuGaS$_2$, CuInS$_2$, CuAlSe$_2$, GaP, NiO, CoO, FeO, Bi$_2$O$_3$, MoO$_2$ and Cr$_2$O$_3$.

(Substrate)

In the display of the invention, at least one of the opposite electrodes is preferably constituted on plastic substrate.

As the substrate in the invention, film made of a synthesized plastic such as polyolefins such as polyethylene and polypropylene, polycarbonates, cellulose acetate, poly(ethylene terephthalate), poly(ethylene dinaphthalene dicarboxylate), poly(ethylene naphthalate), poly(vinyl chloride), polyimide. polyvinylacetals and polystyrenes are preferably usable, for example. Polystyrenes having syndiotactic structure are also preferably usable. These substrates can be obtained by the methods described in JP-A S62-117708, JP-A H1-46912 and 1-178505. Moreover, a metallic substrate such as stainless steel, a paper substrate such as baryta paper and resin-coat paper and a support formed by providing a reflective layer on the above plastic film and the support described in JP-A S62-253195, pp. 29-31, are cited as the support. Ones described in RD No. 17643, p. 28, No. 18716, right column of p. 647 to left column of p. 648, and No. 307105, p. 879 are also preferably usable. The supports which are thermally treated at a temperature lower than the Tg such as that described in U.S. Pat. No. 4,141,735 for inhibiting the curling caused by winding can be used. These supports may be subjected to a surface treatment for improving the adhesion with another constituting layer. A treatment by glow discharge, UV irradiation, corona or flame can be used in the invention. Furthermore, the supports described in Kouchi Gijutu (known technology) No. 5, Mar. 22, 1991, pp. 44-149, Aztec Corp., are also usable. Moreover, supports described in RD No. 308119, p. 1009, Product License Index, 92, p. 108, item of Support are cited. Other than the above, a glass support and epoxy resin in which glass is kneaded are usable.

(Electrode)

In the display element of the invention, at least one of the opposite electrodes is preferably a metallic electrode. For the metallic electrode, known metal species such as platinum, gold, silver, copper, aluminum, zinc, nickel, titanium, bismuth, and their alloys are usable. Metals having work function near the redox potential of silver in the electrolyte are preferable as the metallic electrode. Among them, a silver electrode composed of silver or that containing 80% or more silver is advantageous for maintaining the reducing condition of silver and superior in the prevention of the contamination of the electrode. The electrode is produced by a known method such as a vapor deposition method, printing method, inkjet method, spin coat method and CVD method, for example.

In the display element of the invention, at least one of the opposite electrodes is preferably a transparent electrode. There is no limitation as to the transparent electrode as long as that is transparent and electro conductive. For example, indium tin oxide (ITO), indium zinc oxide (IZO), fluorine-doped tin oxide (FTO), indium oxide, zinc oxide, platinum, gold, silver, rhodium, copper, chromium, carbon, aluminum, silicon, amorphous silicon, bismuth silicon oxide (BOS) are cited. Such the electrode can be formed, for example, by vapor depositing an ITO layer on the substrate through a mask by a spattering method or patterning by a photolithographic method after uniformly forming an ITO layer. The surface conductivity is preferably not more than 100Ω/☐ and more preferably not more than 10Ω/☐. The thickness of the transparent electrode is usually from 0.1 to 20 μm though there is no limitation.

(Another Constituent of Display)

In the display element of the invention, a sealing agent, columnar structural material and spacer particle can be used according to necessity.

The sealing agent is a material for preventing leak of the contents and is also called as a sealant, and a curable resin such a thermal curable type, photo curable type, a moisture curable type and an anaerobic curable resins, for example, an epoxy resin, a urethane type resin, an acryl type resin, a vinyl acetate type resin, an ene-thiol type resin, a silicone type resin and a modified-polymer resin are usable.

The columnar structural material gives strong self hold ability (strength) between the substrates, for example, structural materials having shape of columnar, prism, oval columnar, trapezoidal prism each arranged at a certain space to form a designated pattern such as a lattice orientation can be applied. The structural material may also be a stripe-shaped material arranged at a certain interval. It is preferable that the arrangement of the columnar materials is considered so that the space between the substrates is suitably held and the image display is not disturbed, such the arrangement includes an arrangement having the equal interval, the gradually varying interval and that in which a designated patter is repeated at a certain cycle without random arrangement. Practically suitable strength for the display can be obtained when the ratio of the area occupied by the columnar structural material is from 1 to 40% of the area of the display.

A spacer may be provided for keeping uniformity of the gap between the pair of the substrates. As the spacer, sphere of resin or inorganic material can be exemplified. A fixing spacer having a thermoplastic resin coating layer on the surface thereof is also suitably usable. For uniformly holding the gap between the substrates, the columnar structural material may be used solely or together with the spacer or the spacer is solely used instead of the columnar structural material. The diameter of the spacer is lower than or preferably the same as the height of the columnar structural material when such the structural material is formed. When no columnar structural material is formed, the diameter of the spacer corresponds to the thickness of the cell gap.

(Screen Printing)

In the invention, the sealing agent, columnar structural material and electrode can be pattered by the screen printing. In the screen printing, a screen having designated patterns formed thereon is overlapped on the electrode surface of the substrate and the material to be printed (a composition for forming the columnar structure such as photo curable resin) is put on the screen and a squeezer is moved at a designated pressure, angle and speed. Thus the material to be printed is transferred on to the substrate through the patterns on the screen, and then the transferred material is cured and dried. When the columnar structural material is formed by the screen printing, the resin material is not limited to the photo curable resin and a thermally curable resin such as epoxy resin and acryl resin and a thermoplastic resin are also applicable. As the thermoplastic resin, poly(vinyl chloride) resin, poly(vinylidiene chloride) resin, poly(vinyl acetate) resin, polymethacrylate resin, polyacrylate resin, polystyrene resin, polyamide resin, polyethylene resin, polypropylene resin, fluoro resin, polyurethane resin, polyacrylonitrile resin, poly (vinyl ether) resin, poly(vinyl ketone) resin, polyether resin, polyvinylpyrrolidone resin, saturated polyester resin, polycarbonate resin and poly(ether chloride) resin are cited. The resin is preferably used in a paste state by dissolving a suitable solvent.

After the columnar structural material is formed on the substrate as above, the spacer is provided onto at least one of the substrate according to necessity and one of the pair of the substrates is placed on the other so as to be faced the electrode forming surface to prepare an empty cell. The piled pair of the substrates is pasted by heating while pressing from both sides to form a display cell. For completing the display element, the electrolyte composition is injected between the substrates by a vacuum injection method. In otherwise, it is allowed that the electrolyte composition is previously dropped on one of the substrate on the occasion of pasting so that the electrolyte composition is enclosed together with the pasting at the same time.

<<Driving Method of Display Element>>

In the display element of the invention, the driving method is preferably applied, in which the deposition of blacken silver is carried out by applying a voltage higher than the deposition overpotential and the deposition is continued by applying a voltage lower than the deposition overpotential. Lowering of the writing energy and load on the driving circuit and rising the writing speed of image can be realized by such the driving operation. It is usually known that there is overvoltage in the electrode reaction in the field of electrochemistry. For instance, the overvoltage is described in detail in "Chemistry of Electron Transfer-Primer of electrochemistry" p. 121, Asakura Shoten, 1996. The display element of the invention can be also considered as an electrode reaction between the electrode and silver in the electrolyte, therefore it can be easily understood that the overvoltage is caused with the deposition of silver. The magnitude of the overvoltage is depended on the exchanging current density, therefore it is presumed that electric energy at the surface of the blackened silver is lower and electron injection can easily carried out since the deposition of blackened silver can be continued by applying voltage lower than the deposition overpotential after the formation of blackened silver as in the invention.

The driving operation of the display element of the invention may be simple matrix derive or active matrix drive. The simple matrix drive in the invention is a driving method in which electric current is successively applied to a circuit constituted by an anode line containing plural anodes and a cathode line containing plural cathodes which are faced so that the lines are crossed at a right angle. The use of the simple matrix drive has merits that the circuit configuration and the driving IC can be simplified and the cost can be lowered. The active matrix is a method in which the driving is carried out by TFT circuits each formed at the crossing point of lattice constituted by scanning lines, data lines and electric current supplying lines. Such the method has merits of gradation and memory function since switching can be performed by every pixel, for example, the circuit described in JP-A 2004-29327, FIG. 5 can be used.

<<Commercial Application>>

The display element of the invention can be applied in the fields relating to electronic book, ID card, public, transport, broad casting, accounting and commodity distribution. In concrete, the followings are cited; a door key, student identification card, staff identification card, various member's card, convenience store card, department store card, automatic selling machine card, gasoline station card, subway or rail way card, bus card, cash card, credit card, highway card, driving license, medical consultation ticket, clinical record, health insurance certificate, residence registration ledger, passport and electronic book.

EXAMPLES

The invention is concretely described referring examples though the invention is not limited to the examples. "part" and "%" described in the examples are each represents "part by weight and "weight percent" respectively.

EXAMPLE 1

<<Preparation of Electrolyte Liquid>>
(Preparation of Electrolyte Liquid 1)

Into 2.5 g of dimethylsulfoxide, 75 mg of silver tosylate and 150 mg of the following compound 1 were added and completely dissolved and then 125 mg of titanium dioxide CR-90, manufactured by Ishihara Sangyo Kaisha Ltd., was added and dispersed by an ultrasonic disperser to obtain Electrolyte Liquid 1.

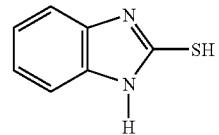

Compound 1

(Preparation of Electrolyte Liquid 2)

Electrolyte Liquid 2 was prepared in the same manner as in Electrolyte Liquid 1 except that the adding amount of titanium dioxide was varied from 125 mg to 500 mg.

(Preparation of Electrolyte Liquid 3)

Into 2.5 g of dimethylsulfoxide, 125 mg of butyral resin having a polymerization degree of 1,200 and a PVA group ratio of 10%, 75 mg of silver tosylate and 150 mg of the above Compound 1 were added and completely dissolved and then 500 mg of titanium dioxide CR-90, manufactured by Ishihara Sangyo Kaisha Ltd., was added and dispersed by the ultrasonic disperser to obtain Electrolyte Liquid 3.

(Preparation of Electrolyte Liquid 4)

Electrolyte Liquid 4 was prepared in the same manner as in Electrolyte Liquid 3 except that the adding amount of the butyral rein was changed from 125 mg to 1,500 mg.

(Preparation of Electrolyte Liquid 5)

Into 2.5 g of dimethylsulfoxide, 375 mg of Compound 2 (polyethylene oxide having an average molecular weight of 200,000), 75 mg of silver tosylate and 150 mg of the above Compound 1 were added and completely dissolved and then 500 mg of titanium dioxide CR-90, manufactured by Ishihara Sangyo Kaisha Ltd., was added and dispersed by the ultrasonic disperser to obtain Electrolyte Liquid 5.

(Preparation of Electrolyte Liquid 6)

Electrolyte Liquid 6 was prepared in the same manner as in Electrolyte Liquid 5 except that the dimethylsulfoxide was replaced by the same amount of chloroform, Compound 2 was replaced by Butyral Resin 1 (butyral resin having an average polymerization degree of 1,200 and a PVA group ratio of 10%) and the amount of titanium dioxide CR-90, manufactured by Ishihara Sangyo Kaisha Ltd., was changed to 1,000 mg.

(Preparation of Electrolyte Liquid 7)

Electrolyte Liquid 6 was prepared in the same manner as in Electrolyte Liquid 5 except that Compound 2 was replaced by Butyral Resin 2 (butyral resin having an average polymerization degree of 200 and a PVA group ratio of 10%) and the amount of titanium dioxide CR-90, manufactured by Ishihara Sangyo Kaisha Ltd., was changed to 1,000 mg.

(Preparation of Electrolyte Liquid 8)

Electrolyte Liquid 8 was prepared in the same manner as in Electrolyte Liquid 7 except that Butyral Resin 2 was replaced by Butyral Resin 1 (butyral resin having an average polymerization degree of 1,200 and a PVA group ratio of 10%).

(Preparation of Electrolyte Liquid 9)

Electrolyte Liquid 9 was prepared in the same manner as in Electrolyte Liquid 7 except that Butyral Resin 2 was replaced by Butyral Resin 3 (butyral resin having an average polymerization degree of 600 and a PVA group ratio of 10%).

(Preparation of Electrolyte Liquid 10)

Electrolyte Liquid 10 was prepared in the same manner as in Electrolyte Liquid 7 except that Butyral Resin 2 was replaced by Butyral Resin 4, (#3000-1, manufactured by Denki Kagaku Kogyo K.K.) and the adding amount of titanium dioxide CR-90, manufactured by Ishihara Sangyo Kaisha Ltd., was changed to 1,250 mg.

(Preparation of Electrolyte Liquid 11)

Electrolyte Liquid 11 was prepared in the same manner as in Electrolyte Liquid 7 except that Butyral Resin 2 was replaced by Butyral Resin 5 (butyral resin having an average polymerization degree of 600 and a PVA group ratio of 25%) and its adding amount was changed to 250 mg.

(Preparation of Electrolyte Liquid 12)

Electrolyte Liquid 12 was prepared in the same manner as in Electrolyte Liquid 11 except that dimethylsulfoxide was replaced by the same amount of dimethylformamide and Butyral Resin 5 was replaced by Butyral Resin 4.

(Preparation of Electrolyte Liquid 13)

Electrolyte Liquid 13 was prepared in the same manner as in Electrolyte Liquid 10 except that dimethylsuofoxide was replaced by the same amount of propylene carbonate.

(Preparation of Electrolyte Liquid 14)

Into 2.5 g of γ-butylolactone, 500 mg of Butyral Resin 4 (#3000-1, manufactured by Denki Kagaku Kogyo K.K.), 75 mg of silver tosylate and 150 mg of Compound 1 were added and completely dissolved and then 1,500 mg of titanium dioxide CR-90 was added and dispersed by the ultrasonic disperser to obtain Electrolyte Liquid 14.

(Preparation of Electrolyte Liquid 15)

Electrolyte Liquid 15 was prepared in the same manner as in Electrolyte Liquid 14 except that Compound 1 was replaced by Exemplified Compound 1-12.

(Preparation of Electrolyte Liquid 16)

Electrolyte Liquid 16 was prepared in the same manner as in Electrolyte Liquid 14 except that Compound 1 was replaced by Exemplified Compound 2-1.

(Preparation of Electrolyte Liquid 17)

Into 2.5 g of propylene carbonate, 1,250 mg of titanium dioxide CR-90 was added and dispersed by the ultrasonic disperser and the 375 mg of Butyral Resin 4, 75 mg of silver tosylate and 150 mg of Compound 1 were added and completely dissolved to obtain Electrolyte Liquid 17.

The organic solvents described in Table 1 in acronyms are as follows.

DMSO: Dimethylformamide
CF: Chloroform
DMF: Dimethylformamide
PC: Propylene carbonate
γ-BL: γ-butylolactone <<Preparation of Electrode>>

(Preparation of Electrode 1)

An ITO layer having a pitch of 145 μm and a width of 130 μm was formed on a glass substrate of 2 cm×4 cm with a thickness of 1.5 mm by known method to obtain a transparent electrode (Electrode 1).

(Preparation of Electrode 2)

A silver-palladium electrode having a thickness of 0.8 μm, a pitch of 145 μm and a electrode interval of 130 μm was formed on a glass substrate of 2 cm×4 cm with a thickness of 1.5 mm by known method to obtain Electrode 2.

<<Preparation of Display Element>>

(Preparation of Display Element 1)

The above prepared Electrolyte Liquid 1 was coated on electrode 2 by a blade coating method to form an electrolyte layer of 100 μm and an epoxy type UV curable resin was coated on the circumstance of the electrolyte layer and then electrode 1 was pasted to prepare Display Element 1.

(Preparation of Display Elements 2 to 17)

Display elements 2 to 17 were each prepared in the same manner in Display Element 1 except that Electrolyte Liquid 1 was replaced by Electrolyte Liquids 2 to 17, respectively.

TABLE 1

| | | Constituent of electrolyte layer | | | | | | | | | |
|---|---|---|---|---|---|---|---|---|---|---|---|
| | | Organic solvent | | | Polymer compound | | | PVA | Coloring material (CR-90) | | |
| Display element No. 1 | Electrolyte liquid No. | Kind | Boiling point (°C.) | Dielectric constant | Kind | Adding amount *1 | Polymerization degree | group ratio (%) | Adding amount *2 | Silver salt solvent | Remarks |
| 1 | 1 | DMSO | 189 | 47 | — | — | — | — | 5 | Compound 1 | Comp. |
| 2 | 2 | DMSO | 189 | 47 | — | — | — | — | 20 | Compound 1 | Comp. |
| 3 | 3 | DMSO | 189 | 47 | ** 1 | 5 | 1200 | 10 | 20 | Compound 1 | Comp. |

TABLE 1-continued

Constituent of electrolyte layer

| Display element No. 1 | Electrolyte liquid No. | Organic solvent | | | Polymer compound | | | PVA group ratio (%) | Coloring material (CR-90) Adding amount *2 | Silver salt solvent | Remarks |
|---|---|---|---|---|---|---|---|---|---|---|---|
| | | Kind | Boiling point (° C.) | Dielectric constant | Kind | Adding amount *1 | Polymerization degree | | | | |
| 4 | 4 | DMSO | 189 | 47 | ** 1 | 60 | 1200 | 10 | 20 | Compound 1 | Comp. |
| 5 | 5 | DMSO | 189 | 47 | Compound 2 | 15 | — | — | 20 | Compound 1 | Comp. |
| 6 | 6 | CF | 61 | 4.8 | ** 1 | 15 | 1200 | 10 | 40 | Compound 1 | Comp. |
| 7 | 7 | DMSO | 189 | 47 | ** 2 | 15 | 200 | 10 | 40 | Compound 1 | Inv. |
| 8 | 8 | DMSO | 189 | 47 | ** 1 | 15 | 1200 | 10 | 40 | Compound 1 | Inv. |
| 9 | 9 | DMSO | 189 | 47 | ** 3 | 15 | 600 | 10 | 40 | Compound 1 | Inv. |
| 10 | 10 | DMSO | 189 | 47 | ** 4 | 15 | 600 | 18 | 50 | Compound 1 | Inv. |
| 11 | 11 | DMSO | 189 | 47 | ** 5 | 10 | 600 | 25 | 40 | Compound 1 | Inv. |
| 12 | 12 | DMF | 153 | 38 | ** 4 | 10 | 600 | 18 | 40 | Compound 1 | Inv. |
| 13 | 13 | PC | 242 | 60 | ** 4 | 15 | 600 | 18 | 50 | Compound 1 | Inv. |
| 14 | 14 | γ-BL | 204 | 40 | ** 4 | 20 | 600 | 18 | 60 | Compound 1 | Inv. |
| 15 | 15 | γ-BL | 204 | 40 | ** 4 | 20 | 600 | 18 | 60 | Compound 1-12 | Inv. |
| 16 | 16 | γ-BL | 204 | 40 | ** 4 | 20 | 600 | 18 | 60 | Compound 2-1 | Inv. |
| 17 | 17 | PC | 242 | 60 | ** 4 | 15 | 600 | 18 | 50 | Compound 1 | Inv. |

*1: Weight ratio to organic solvent (%),
*2: Weight ratio to organic solvent (%)
**: Butyral resin,
Comp.: Comparative,
Inv.: Inventive <<Evaluation of Display Element>>

(Measurement of Reflectivity at White Image Displaying Time)

A white image was displayed on each of the above prepared display elements by applying 1.5 volt for 3 seconds and the reflectance thereof was measured at 550 nm by a spectral colorimeter CM-3700d, manufactured by Konica Minolta Sensing Corp. Measured reflectance $R_W$ was defined as an indicator of the reflectivity at the white image displaying time.

(Evaluation of Displaying Speed)

A white image was displayed on the above prepared display elements by applying 1.5 V for 3 seconds and then −1.5 V is applied for 0.5 seconds to display a gray image. The reflectance on the gray image at 550 nm was measured by the spectral colorimeter CM-3700d, manufactured by Konica Minolta Sensing Corp. Thus measured reflectance was referred to as $R_{Gray}$ and $R_{Gray}$ was defined as the indicator of the displaying speed. Lower $R_{Gray}$ corresponds to higher displaying speed.

(Evaluation of Withstanding Ability to Unevenness Formation)

The above prepared display elements were each stood for 20 days at 25° C. and a gray image was displayed on the display by applying 1.5 volt for 3 seconds to form a white image and then applying −1.5 V for 0.5 seconds. The reflectance at 550 nm of the gray image was measured at optional five points by the spectral colorimeter CM-3700d, manufactured by Konica Minolta Sensing Corp., and the difference between the highest and lowest values of the reflectance. The calculated difference was referred to as $\Delta R_{Gray}$ and $\Delta R_{Gray}$ was defined as an indicator of the change of displaying speed. Lower $\Delta R_{Gray}$ value corresponds to higher withstanding ability to unevenness formation.

The above obtained results are listed in Table 2.

TABLE 2

| | Evaluation results | | | |
|---|---|---|---|---|
| Display element No. | Displaying speed $R_{Gray}$ (%) | Reflectance $R_W$ (%) | Withstanding ability to unevenness formation (After 20 days) $\Delta R_{Gray}$ (%) | Remarks |
| 1 | 12 | 31 | 15 | Comparative |
| 2 | 13 | 42 | 30 | Comparative |
| 3 | 15 | 42 | 38 | Comparative |
| 4 | Butyral resin was not dissolved | | | Comparative |
| 5 | 20 | 41 | 23 | Comparative |
| 6 | 48 | 52 | 7 | Comparative |
| 7 | 8 | 53 | 11 | Inventive |
| 8 | 11 | 52 | 8 | Inventive |
| 9 | 8 | 53 | 7 | Inventive |
| 10 | 5 | 59 | 5 | Inventive |
| 11 | 11 | 53 | 7 | Inventive |
| 12 | 11 | 52 | 11 | Inventive |
| 13 | 5 | 54 | 3 | Inventive |
| 14 | 5 | 61 | 3 | Inventive |
| 15 | 2 | 63 | 1 | Inventive |
| 16 | 2 | 62 | 2 | Inventive |
| 17 | 10 | 52 | 10 | Inventive |

As is shown in the results in Table 2, the reflectance is raised by increasing the adding amount of titanium dioxide. However, it is understood that higher unevenness is caused after long time standing of the display element when the butyral resin according to the invention is not used.

On the other hand, it is understood that the display elements having the electrolyte layer according to the constitution of the invention are superior to the comparatives in the reflectivity at the white image displaying time, displaying speed and withstanding ability to unevenness formation.

Among the display elements of the invention, it is understood that the rising degree of the displaying speed and the inhabitation effect to unevenness are high when Butyral Resin #3000-1 has an average polymerization degree within the range of from 400 to 800 and a PVA group ratio within the range of from 15 to 25%.

It is understood that the display unevenness inhibiting effect is further enhanced when propylene carbonate and γ-butylolactone are used, which are the organic solvent having a boiling point within the range of from 200° C. to 300° C. and a dielectric constant within the range of from 30 to 80.

It is understood that the display elements using Compound 1-12 represented by Formula 1 or Compound 2-1 represented by Formula 2 are further higher in the degree of the improving of the displaying speed.

Moreover, it is understood that the display elements having the electrolyte layer formed by the electrolyte liquid obtained by adding the titanium dioxide after dissolution of the butyral resin in the organic solvent are higher in the raising in the displaying speed and the inhibition effect to unevenness formation compared with the display elements using the electrolyte layer formed by the electrolyte liquid obtained by dissolving the butyral resin after addition of the titanium dioxide to the organic solvent.

Example 2

<<Preparation of Display Element>>

(Preparation of Display Element 18)

Display Element 18 was prepared in the same manner as in Display Element 15 except that TFT (thin layer transistor) of 200 dpi were used in place of Electrode 2 and then Electrolyte Liquid 16 was patterned onto every pixel electrode unit of the TFT by a screen printing method to form the electrolyte layer.

(Preparation of Display Element 19)

Display Element 19 was prepared in the same manner as in Display Element 15 except that TFT (thin layer transistor) of 200 dpi were used in place of Electrode 2 and then Electrolyte Liquid 16 was dropped onto every pixel electrode unit of the TFT by a dispenser to form the electrolyte layer.

(Preparation of Display Element 20)

Display Element 20 was prepared in the same manner as in Display Element 15 except that TFT (thin layer transistor) of 200 dpi were used in place of Electrode 2 and then Electrolyte Liquid 16 was jetted onto every pixel electrode unit of the TFT by an inkjet method to form the electrolyte layer.

<<Evaluation of Display Element>>

The above prepared Display Elements 18 to 20 were subjected to evaluation of the reflectivity of white image display, displaying speed and withstanding ability to unevenness formation in the same manner as in Example 1. As a result of that, it was confirmed that the above display elements were higher in the reflectivity and the displaying speed, lower in the unevenness of displayed image and higher in the sharpness compared with the comparative examples in Example 1.

Moreover, it was confirmed that the above-described effects can be sufficiently obtained when an electrode using a plastic substrate was used.

What is claimed is:

1. A display element comprising an electrolyte layer containing silver or a compound containing silver in a chemical structure thereof between opposed electrodes, and carrying out driving operation for the opposed electrodes to induce silver dissolution and deposition, wherein the electrolyte layer comprises a butyral resin having a number of PVA groups represented by (A) of from 15% to 25% based on a total number of the PVA groups represented by (A), PVAc group represented by (B), and PVB group represented by (C),

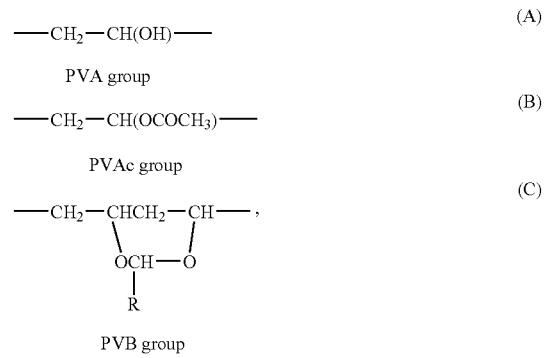

wherein R is a hydrogen atom, an alkyl group, a cycloalkyl group, an aryl group or a heterocyclic group, a coloring material having an average primary particle diameter of from 200 nm to 1,000 nm, an organic solvent having a boiling point of from 120° C. to 300° C., and a weight ratio of the organic solvent to the butyral resin is between 10:1 and 10:5.

2. The display element of claim 1, wherein the weight ratio of the organic solvent to the butyral resin is between 10:1 and 10:3.

3. The display element of claim 1, wherein the butyral resin has a polymerization degree of from 300 to 1,000.

4. The display element of claim 1, wherein the butyral resin has a polymerization degree of from 400 to 800.

5. The display element of claim 1, wherein the organic solvent has a boiling point of from 200° C. to 300° C.

6. The display element of claim 1, wherein the organic solvent has a dielectric constant of from 30 to 80.

7. The display element of claim 1, wherein the organic solvent is a cyclic carboxylic acid ester type compound.

8. The display element of claim 1, wherein the coloring material is a titanium dioxide.

9. The display element of claim 8, wherein a surface of the titanium dioxide is treated by $SiO_2$, $Al_2O_3$ or an organic compound.

10. The display element of claim 1, wherein the weight ratio of the organic solvent to the coloring material in the electrolyte layer is between 10:1 and 10:10.

11. The display element of claim 1, wherein the weight ratio of the organic solvent to the coloring material in the electrolyte layer is between 10:2 and 10:8.

12. The display element of claim 1, wherein the electrolyte layer contains a mercapto compound or a thioether compound.

13. The display element of claim 12, wherein the mercapto compound is a compound represented by Formula 1,

wherein M is a hydrogen atom, a metal atom or a quaternary ammonium, Z is a nitrogen-containing heterocyclic group, n is an integer of from 0 to 5, and $R_1$ is a hydrogen atom, a halogen atom, an alkyl group, an aryl group, an alkylcarbonamido group, an arylcarbonamido group, an alkylsulfonamido group, an arylsulfonamido group, an alkyloxy group, an aryloxy group, an alkylthio group, an arylthio group, an alkylcarbamoyl group, an arylcarbamoyl group, a carbamoyl group, an alkylsulfamoyl group, an arylsulfamoyl group, a sulfamoyl group, a cyano group, an alkylsulfonyl group, an arylsulfonyl group, an alkoxycarbonyl group, an aryloxycarbonyl group, an alkylcarbonyl group, an arylcarbonyl group, an acyloxy group, a carboxyl group, a carbonyl group, a sulfonyl group, an amino group, a hydroxyl group and a heterocyclic group. Each of the groups of $R_1$ may be the same as or different from each other when n is 2 or more and may form a condensed ring by bonding with each others.

14. The display element of claim 12, wherein the thioether compound is a compound represented by Formula 2, $$R_2\text{—}S\text{—}R_3, \qquad \text{Formula 2}$$

wherein $R_2$ and $R_3$ each are an alkyl group, an aryl group or a heterocyclic group which may be the same or different and may form a ring by bonding with each others.

15. The display element of claim 1, wherein the electrolyte layer is formed by a screen printing.

16. The display element of claim 1, wherein the electrolyte layer is formed by a dropping from a dispenser.

17. The display element of claim 1, wherein the electrolyte layer is formed by an inkjet method.

18. The display element of claim 1, wherein at least one of the opposite electrodes is formed on a plastic substrate plate.

19. The display element of claim 1, wherein the electrolyte layer is formed by adding the coloring material after dissolving the butyral type resin in the organic solvent.

* * * * *